United States Patent
Peiro et al.

(10) Patent No.: US 8,218,198 B2
(45) Date of Patent: Jul. 10, 2012

(54) COLOR SELECTION

(75) Inventors: Josep Abad Peiro, Sant Cugat Barcelona (ES); Jordi Arnabat Benedicto, L'Arboç Tarragona (ES); Ignacio Ruiz-De-Conejo, Sant Cugat del Valles Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 775 days.

(21) Appl. No.: 12/278,922

(22) PCT Filed: Mar. 7, 2006

(86) PCT No.: PCT/EP2006/060526
§ 371 (c)(1),
(2), (4) Date: Mar. 27, 2009

(87) PCT Pub. No.: WO2007/101472
PCT Pub. Date: Sep. 13, 2007

(65) Prior Publication Data
US 2009/0251485 A1    Oct. 8, 2009

(51) Int. Cl.
*G06K 1/00* (2006.01)
*G09G 5/02* (2006.01)
(52) U.S. Cl. .......... 358/1.9; 358/504; 345/593; 345/594
(58) Field of Classification Search .......... 358/1.9, 358/1.15, 302, 504, 518, 520; 382/162, 167; 345/590, 591, 593, 594, 601
See application file for complete search history.

(56) References Cited

U.S. PATENT DOCUMENTS

| | | | |
|---|---|---|---|
| 5,254,978 A * | 10/1993 | Beretta | 345/601 |
| 6,944,334 B2 * | 9/2005 | Piatt et al. | 382/167 |
| 7,032,517 B2 * | 4/2006 | Bestmann | 358/1.9 |
| 7,420,707 B2 * | 9/2008 | Agehama | 358/1.9 |
| 2002/0036787 A1 * | 3/2002 | Kondo | 358/1.9 |
| 2003/0103234 A1 * | 6/2003 | Takabayashi et al. | 358/1.15 |
| 2004/0150848 A1 * | 8/2004 | Delang et al. | 358/1.9 |
| 2005/0018024 A1 * | 1/2005 | Sommer et al. | 347/100 |
| 2005/0094169 A1 * | 5/2005 | Berns et al. | 358/1.9 |
| 2005/0150411 A1 * | 7/2005 | Bestmann | 101/484 |
| 2005/0206925 A1 * | 9/2005 | Agehama | 358/1.9 |
| 2006/0007457 A1 * | 1/2006 | Namikata | 358/1.9 |
| 2006/0152744 A1 * | 7/2006 | Sanger | 358/1.9 |
| 2006/0152745 A1 * | 7/2006 | Sanger | 358/1.9 |

(Continued)

FOREIGN PATENT DOCUMENTS
EP    1 229 732    8/2002

(Continued)

*Primary Examiner* — Kimberly A Williams
(74) *Attorney, Agent, or Firm* — Guillaume Durville

(57) ABSTRACT

A method of forming a color selection including selected color points. A first cluster in a color space is provided, the cluster being associated to a first color representation system. A second cluster in the color space is provided, the cluster being associated to a second color representation system, whereby the second cluster differs from the first cluster. A predetermined color point in the color space is provided. Included in the color selection are at least a first selected color point and a second selected color point, the first selected color point being the point of the first cluster which among all points of the first cluster is closest to the predetermined color point and the second selected color point being the point of the second cluster which among all points of the of the second cluster is closest to the predetermined color point.

20 Claims, 5 Drawing Sheets

U.S. PATENT DOCUMENTS

| | | | |
|---|---|---|---|
| 2006/0158881 A1* | 7/2006 | Dowling | 362/231 |
| 2008/0043271 A1* | 2/2008 | Gil et al. | 358/1.9 |
| 2008/0158579 A1* | 7/2008 | Ohga et al. | 358/1.9 |
| 2008/0291479 A1* | 11/2008 | Mestha et al. | 358/1.9 |
| 2011/0235141 A1* | 9/2011 | Shestak et al. | 358/504 |

FOREIGN PATENT DOCUMENTS

| | | |
|---|---|---|
| EP | 1 294 178 | 3/2003 |
| WO | WO-99/01982 | 1/1999 |

\* cited by examiner

Form, with a processing system, a color selection that includes a selected color point from each different cluster, each selected color point being the point of the corresponding cluster which among all points of that cluster is closest to the predetermined color point 540

Exclude from the color selection the selected color point of a third or further cluster, wherein the selected color points of a first and second cluster are closer to the predetermined color point than the at least one excluded color point 542

Evaluate a distance-to-reference for each selected color point, the distance-to-reference separating the selected color point from the point of the reference cluster closest to the selected color point 544

Identify the selected color point having the smallest distance-to-reference 546

Represent the color selection using a color palette 550

Display the color palette on a viewing device or a print media 552

Display for each selected color point the distance separating that color point from the predetermined color point 554

Display for each selected color point the distance-to-reference associated to that color point 556

End

FIG. 4B

COLOR SELECTION

FIELD OF THE INVENTION

The present invention relates generally to the field of color management, and, for example, to the field of choosing and generating an appropriate color.

BACKGROUND OF THE INVENTION

With traditional analog techniques, the challenge of choosing colors for graphical elements such as company logos consisted solely in making the right color choice from among the colors in a specially printed swatch book. A graphic designer could focus on choosing a color that embodies the image the client wanted to project and once the choice was made, it could be simply and reliably communicated to a print service provider. In the case of the swatch books most popular in North America and Europe—the PANTONE® Formula Guide—the graphic designer simply specifies the name of the Pantone color (e.g. "PANTONE 653 C"—i.e., HP's corporate identity color) and a physical color chip showing the actual color could also be provided for additional reassurance. The print service provider would then look up the chosen color and from there translate the named color into a combination of the basic inks required to reproduce the specified Pantone color. Hence not having a good idea on how close that ink combination would result from the intended Pantone reference.

Today, however, the neat and simple approach described above is not accurate enough due to the ever increasing use of a variety of digital printing systems, which are not compatible with the use of the fifteen basic Pantone inks, but, instead, rely on their own specific printing techniques which might, e.g., be based on a different set of inks and ways of addressing their use. Even more all selection criteria are hidden from the designer which is just confronted to a choice that has been made to him/her without a real control of the possibilities that were available. With each printing system, a different range of printable colors (i.e. color gamut) is obtained, and, furthermore, the range of obtained colors also depends on the particular print medium used in combination with the digital printing system. In general, the obtained range of colors does not include all of the reference colors, making it necessary to try to reproduce as much as possible a predetermined color choice in a given printing system, resulting in trial and error sessions with preparation stages for example in a pre-press process without guarantee of satisfactory final results.

As a result, the task of the graphic designer becomes significantly more complex in cases where a design is to be printed, even if at least partially, digitally. If, for example, a company wishes to print a large format poster that includes their logo (whose color is defined in Pantone terms) or if a number of leaflets or brochures is to be printed using a laser printer or digital press, then the designer needs to deal with the gamut differences between the Pantone set and the digital printing systems—which are usually not yet known at design phase.

This problem is addressed by reference color simulation techniques which aim at finding for each reference color its best representation in the gamut of a particular combination of printer and print medium.

Providing good simulations of Pantone colors on a given medium is clearly very important, but color simulation techniques are purely computational approaches which often do not address the problem of usability and interactivity of digital color simulation systems, specially taking into account the large variety of possibilities that a user has, e.g., changing inks, media, or printing devices.

The proposed invention thus addresses aspects which are related to the usability of a color simulation system, e.g. the following problems: First, when looking at a digital print it can be a challenge to see how well a Pantone color is simulated with just the original PANTONE Formula Guide available as what one compares is a relatively small color chip, on the one hand, and a colored graphical element, like a logo, on the other. Second, when looking at a simulation which looks different from the pre-determined Pantone color, it is not clear whether the differences are genuinely due to an inherent gamut difference between printed or emitting media or due to workflow issues. Third, before printing Pantone simulations on a digital printing system the designer does not know how close the simulation will be to the pre-determined color. Fourth, if matching a Pantone color is more important than the choice of media used in the digital printing system the designer is currently faced with many trial and error sessions. Fifth, if the agreement between pre-determined and digitally simulated colors is more important than the precise color choice, again the designer needs to do significant trial and error work.

In order to reduce trial and error work, it is known to work in a simulated color space which represents both a specific cluster associated to a specific color representation system used by the designer and the pre-determined color. The cluster is typically formed by the colors which may be obtained with the specific color representation system. The pre-determined color is the color which the designer wishes to reproduce. The designer may then pick in the color space the color point being part of the cluster which is closest to (or, in an ideal case, which is the same as) the original color.

SUMMARY OF THE INVENTION

According to the invention, a method of forming a color selection is provided, the method including selected color points, the method comprising:

providing a first cluster in a color space, the cluster being associated to a first color representation system;

providing a second cluster in the color space, the cluster being associated to a second color representation system, whereby the second cluster differs from the first cluster;

providing a predetermined color point in the color space;

include in the color selection at least a first selected color point and a second selected color point, the first selected color point being the point of the first cluster which among all points of the first cluster is closest to the predetermined color point and the second selected color point being the point of the second cluster which among all points of the second cluster is closest to the predetermined color point.

According to the invention, a first and a second cluster are provided in a color space. A cluster in a color space is a defined group of points of the color space. The color space may be one of a variety of color spaces, including RGB, CMYK or L,a*,b* for example. Each cluster is associated to a color representation system. A color representation system may for example comprise a specific thermal ink jet printer, a specific ink or set of inks, and a specific printing media. Another color representation system may for example comprise a specific computer screen. Another color representation system may for example comprise a specific printing press, a specific set of inks and a specific printing media. Another color representation system may for example comprise a projector. It should be noted that any specific color representation system may be characterized by a profile, the profile being formed by a number of color points which can be represented by the representation system. Such a profile may be constructed using a spectrophotometer. There are normalized profiles such as ICC (International Color Consortium). The profile of a specific color representation system has an envelope, the envelope being a three dimensional surface of the color space which encloses a volume comprising all color points of the profile, the envelope including the peripheral points of the profile. If the specific representation system is used to represent a pre-determined color point which is outside of the volume enclosed by the envelope, this pre-determined color point will be represented only approximately by the specific representation system, for example using the color point of the profile closest to the pre-determined color point. In an embodiment of the invention, each cluster is the profile for the associated color representation system. According to the invention, two different clusters are provided in the color space. Each cluster may be associated with an envelope as defined above for a profile. Each cluster may be associated with a volume of the color space, the volume associated to a cluster being the volume comprising all points of the cluster and being limited by the peripheral points of the cluster. The volume would then have as perimeter the envelope as defined above. Typically, the volume of associated with the first cluster and the volume associated with the second cluster intersect. Typically, the union of both volumes is larger than anyone of the volumes taken alone. According to the invention, the point of the first cluster closest to the pre-determined point is identified and included in the color selection. The point of the second cluster closest to the pre-determined point is also included in the color selection. The notion of "closest" may be determined by a variety of methods, including Euclidian distance between points. This implies that the list will contain at least the best color approximation for the first system and the best color approximation from the second system. The designer may then choose a point out of this color selection as a preferred representation of the pre-determined point. It should be noted that the two systems may for example be different as to price (the first system comprising for example a media which is more expensive than the media comprised in the second system), so that the designer could make an informed choice. The choice may simply be the choice of the point in the selection which is closest to the pre-determined point without taking the properties of the systems into account, but the choice may also be a compromise where the properties of the systems are taken into account. There may be situations for example where the choice of the designer may not be the closest point to the predetermined point because the second best point of the selection is relatively close to the best point of the selection (best as in closer to the pre-determined point) but the second best point may be obtained using a "cheaper" system.

In an embodiment, the at least one of the color representation systems is associated to a specific printing media. The media consist typically of a sheet of paper, which may be laminated, and may also be or comprise plastic resins or textile fibers, woven or non woven. The media is typically laminar, but may have a variety of shapes, for example packages such as bottles or boxes and the like. The media is typically flexible such as a sheet of paper but may also be rigid, such as card board or wood. The media may be provided in the form of a roll. The media may have a variety of characteristics such as being glossy or not, for example.

In an embodiment, at least one of the color representation systems is associated to a specific printing apparatus. The printing apparatus may for example be one of the following: fax machine, photocopier, thermal ink jet printer, laser printer, piezo ink jet printer, digital printing press, offset printing press etc. . . . .

In an embodiment, both color representation systems are associated to the same specific printing apparatus, both color representation systems being associated to different specific printing media.

In an embodiment, at least one of the color representation systems is associated to a specific set of inks.

It should be noted that in the case of a printer, the ICC profile is typically dependent from the printer, from the inks used and from the media used.

In an embodiment at least one of the color representation systems is associated to a specific viewing device. Such a viewing device may for example be one of the following: computer screen, projector, television, etc. . . . .

In an embodiment, a third or further clusters respectively associated to a third or further color representation systems are provided, whereby the color selection further comprises at least one third or further selected color point of each of the third or further clusters, each third or further selected color point being the point of the respective cluster which among all points of the respective cluster is closest to the predetermined color point. In this manner, the designer may compare a variety of systems.

In an embodiment, a third or further clusters respectively associated to a third or further color representation systems is or are provided, whereby at least one color point of one the third or further clusters is excluded from the color selection, the at least one excluded point being the point of the respective cluster which among all points of the respective cluster is closest to the predetermined color point, the first and the second selected color points being closer to the predetermined color point than the at least one excluded color point. In such an embodiment, the "worse" system out of the at least three systems is excluded, in so far as the best color match provided by this "worse" system is further away from the pre-determined point than any one of the "closest point" of the other two systems. This way, a pre-selection is made.

In an embodiment, the method further comprises providing a reference cluster in the color space. Such a reference cluster typically corresponds to a representation in the color space of a specific collection of color samples which are used as a reference by professional. Indeed, since describing colors by mere words lacks precision, professionals prefer to use collections of color samples as a reference. Such color catalogs exist in standardized form as color systems, like the Pantone, the RAL, or the Munsell color systems for example, and instead of trying to characterize a color in mind as, for instance, a "rather reddish not so dark yellow", one can look up a swatch-book and identify this color precisely as e.g. "Pantone number 653 C". Using this number, and the production formula related to this number by the color system standard, a color manufacturer can brew and deliver an ink, or whatever colorant, that matches the special color in mind.

While the real world offers an infinite number of colors in a continuum, a standard color system samples only a subset of them consisting of a finite number of individual colors (in the following are called standard reference colors). Therefore standard colors are used mainly where color precision is emphasized over pictorial qualities, as for the creation and reproduction of graphical elements like corporate logos or signs, for industrial and interior design, in the textile and packaging industry, and so on. Since the standard color system defines the colorant, it guaranties the consistency of a product's color appearance and that any graphical element matches the designer's intention—as long as each single color of an image is produced by using a colorant of that color.

Even though in the embodiments described below in more detail, substantially the Pantone colors are used as the set of standard reference colors, the scope of the invention is not limited to this particular color reference system. It should be noted that more than one reference cluster may be provided in the color space of the invention.

In an embodiment, the method comprises evaluating a distance to reference for a selected color point, the distance to reference separating the respective selected color point from the point of the reference cluster closest to the respective selected color point. In a further embodiment, the method comprises identifying the selected color point having the smallest respective distance to reference. As explained above, where color precision is emphasized over pictorial qualities, or when there is a need to communicate about colors for example, distance to reference could be a useful piece of information. For example, a second best color may be chosen because it has a smaller distance to reference. By second best, in this case, it is meant that there would be a point of a first, second or further cluster which is closer than the pre-determined color point, but has a larger distance to reference.

In an embodiment, the predetermined color point is provided using a spectrophotometer. The method may indeed be used to reproduce an original sample using a color representation system, whereby the color of the original sample is the predetermined color point in the color space.

In an embodiment of the method, at least one of the first, second or further clusters is a representation of an ICC profile of the associated color representation system.

In an embodiment, the color selection is represented by a color palette. A color palette should be understood as a group of color patches, each colour patch representing a point of the selection, the color patches being in an embodiment represented in the form of an array. The color palette may for example be displayed by a viewing device or may for example be printed.

In an embodiment, the color palette displays for each selected color point the distance separating the respective color point from the predetermined color point. In an embodiment, the color palette displays the distance to reference associated to each selected color point. These additional pieces of information may participate in the decision process of a professional or designer in his or her color choice.

In one of its aspect, the invention relates to a method of displaying a palette, whereby the palette is constructed according to the invention. In an embodiment, the palette is displayed using a viewing device. In an embodiment, the palette is displayed on a printing media.

In one of its aspect, the invention relates to a data carrier carrying data arranged to cause a system to perform the method according to the methods of the invention.

BRIEF DESCRIPTION OF THE DRAWINGS

FIGS. 4A-4B are a flowchart of a method of forming a color selection in accordance with an embodiment of the present invention.

DESCRIPTION OF THE PREFERRED EMBODIMENTS

Figure 1:
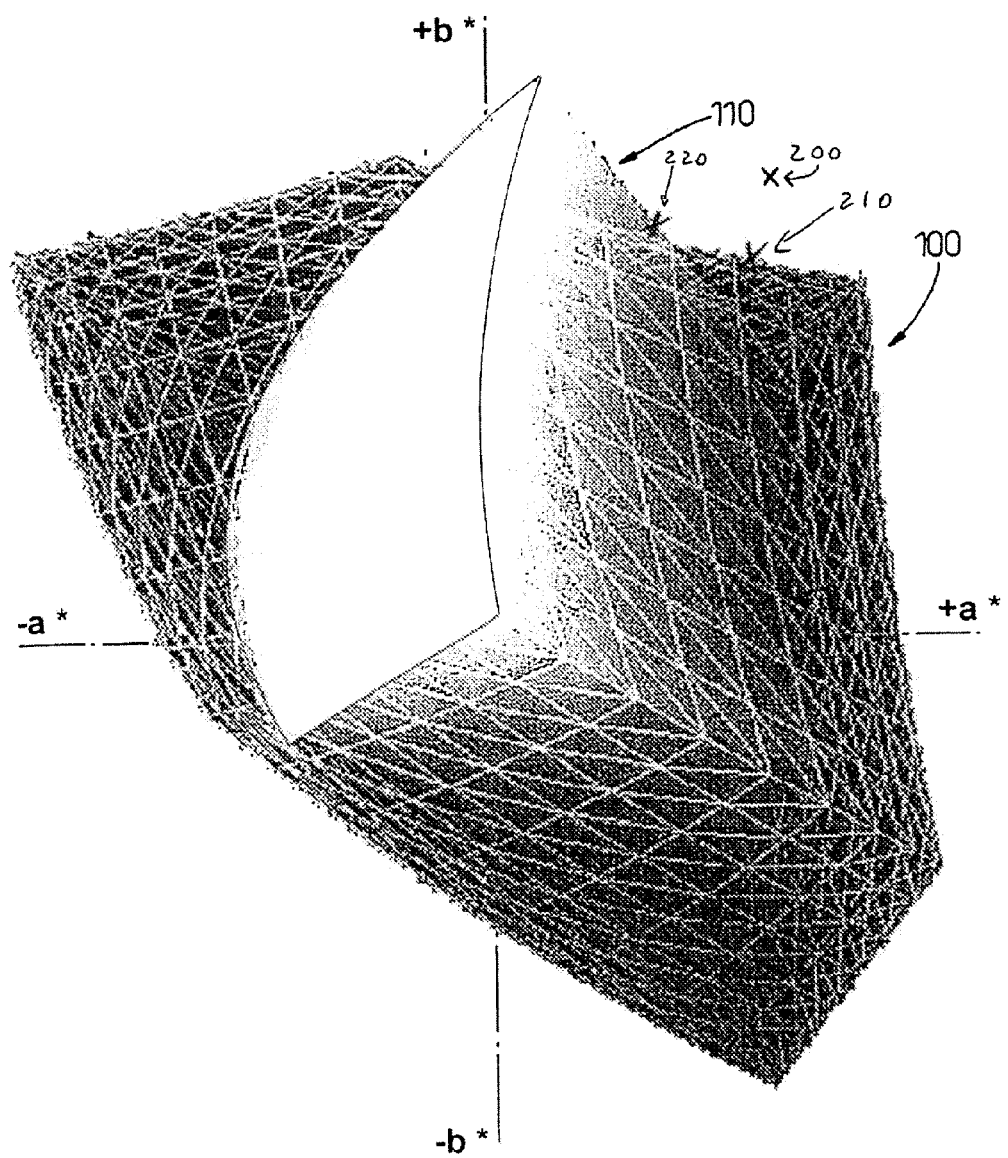
FIG. 1 is a representation of two different gamuts in a color space.

A first color representation system gamut 100 is represented in the L, a*, b* color space in FIG. 1 by its meshed envelope. A second color representation system gamut 110 is represented in the same color space by its solid envelope. The envelope of the gamut represents the outer surface of the smallest volume of the color space which contains all points from the color space which may be represented by the system concerned. As evidenced in FIG. 1, both gamuts 100 and 110 have an intersecting common volume. Gamut 100 also comprises zones which are outside of gamut 110, and gamut 110 comprises zones outside of gamut 100.

Gamut 100 contains all points of the cluster associated to the first color representation system, and gamut 110 contains all points of the cluster associated to the second color representation system. In this example, the first color representation system comprises a printer, and the second color representation system comprises a printing press.

A predetermined color point 200 is provided. In this example, the coordinates of the color point 200 in the L, a*, b* color space are provided by a spectrophotometer reading of a color sample. In this example, the color point is both outside of the first and of the second gamut.

A first selected color point 210 being part of the first cluster and a second selected color point 220 part of the second cluster are identified. Color point 210 is the point of the first cluster which is closest to the color point 200 in Euclidian terms in the L, a*, b* space. Color point 220 is the point of the second cluster which is closest to the color point 200 in Euclidian terms in the L, a*, b* space. Color point 210 is the best approximation for color point 200 which may be obtained using the first color system. Color point 220 is the best approximation for color point 200 which may be obtained using the second color system. In this example, color point 200 is located outside of both gamuts, but color point 200 may be located at any place in the color space. In this example, the first and the second clusters represent the first, respectively second ICC profiles of the first, respectively second color representation system.

In this example, the gamuts refer to two different printing systems in that one is a press and the other is a printer. It should be noted that the gamuts may both refer to the same printer, for example, but to different medias used with that same printer. Generally speaking, these gamuts represent different color representation systems according to the invention.

In this example, only two gamuts representing two color representation systems are illustrated. One or more further color representation systems may also be considered, adding one or more further gamuts corresponding to one or more associated clusters. The color selection according to the invention allows compilation of a number of "best matches" for a predetermined color using a variety of color representation system, letting a user make an informed choice for the preferred color representation system.

In such an example, the user is likely to choose color point 210, and thereby the first color representation system, because the color point 210 is closer to color point 200 than the color point 220. This decision may be different if for example the first color representation system has high running costs which would outweigh the advantage of reproducing the color as best as possible.

Figure 2:
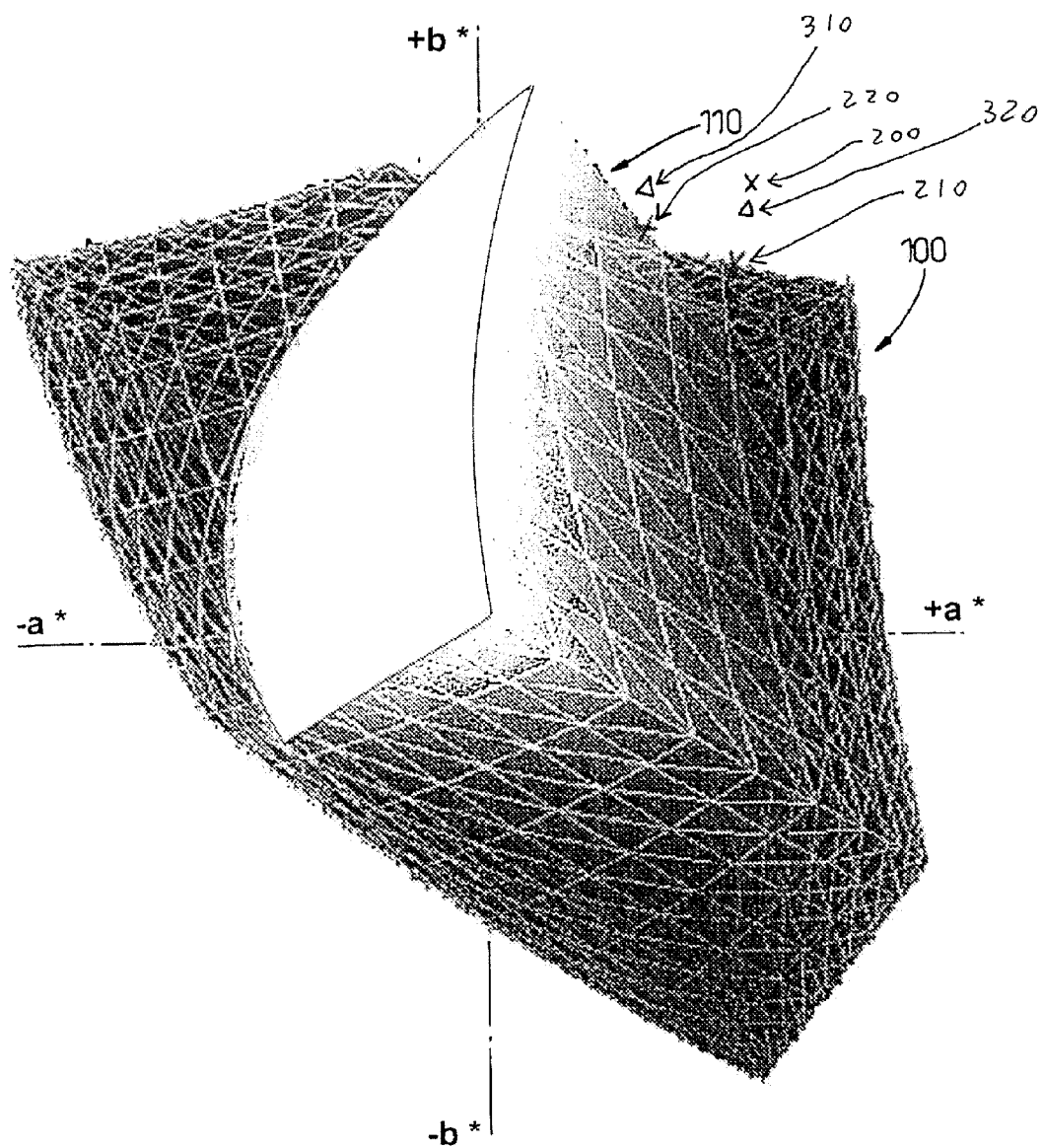
FIG. 2 is a representation of two different gamuts and of a reference cluster in a color space.

In FIG. 2, the same gamuts and points as in FIG. 1 are represented. In addition to these, color points 310 and 320 of a reference cluster are provided. Only two of these are represented, even though there are more color points in the reference cluster. In this example, the reference cluster is a representation of a pantone library. Such a reference is particularly useful when communication is involved. A reference color point will indeed look the same for any user. The distance separating a color point to its closest reference point may then be relevant. In this example, reference color point 310 is the reference color point closest to color point 220. Reference color point 320 is the reference color point closest to color point 210. Points 220 and 310 are separated by a distance to reference for point 220. Points 210 and 320 are separated by a distance to reference for point 210. Because the distance to reference for point 220 is smaller than the distance to reference for point 210, it may be easier to communicate using color point 220, because the people taking part in the communication will have a more accurate view. In other words, if one chooses using color point 220 for representing color point 200, one can communicate that "the choice was to use a color point close to reference point 310", thus allowing any person involved to have an accurate vision of the choices made, leading to a more informed decision. In such a case, even though point 210 is closer to point 200, point 210 could not be described as accurately as point 220 in reference to a point of a reference cluster.

It should be noted that in this example, only one reference cluster is used. It should however be considered that different reference clusters may be used. In particular, a reference cluster may be associated to a specific color representation system.

Figure 3:
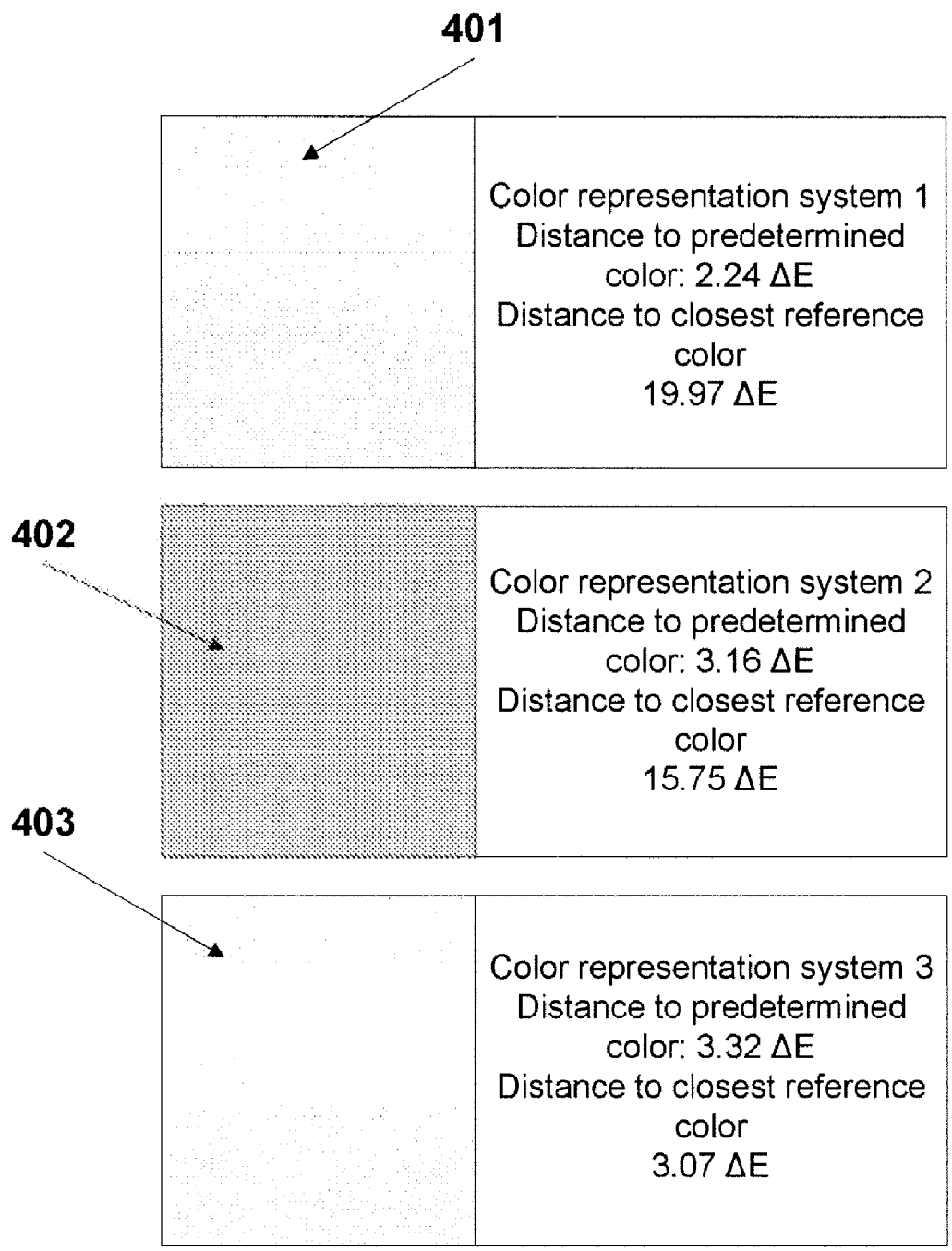
FIG. 3 is a representation of a color selection.

The color selection is for example compiled in a palette as illustrated in FIG. 3. Such a color palette includes the information useful to a user in order to facilitate the choice of an appropriate color representation system for reproduction of a color corresponding to the predetermined color of the predetermined color point. Such a palette may be printed, showed on a screen or projected, for example.

In this example, three color representation systems were used, each of these using one same printer, each of these using a different media. Only the media was changed from one system to the other. Three different medias were considered. For each of the color representation systems, the best color match is reproduced on the palette.

For the first color representation system using the first media type, the best color match is represented by patch 401. Additional information is provided such as the distance from color 401 to the predetermined point in the color space, being in this case 2.24 ΔE, and the distance between color 401 and the closest reference color, in this case 19.97 ΔE.

The same information is provided for color 402, best match of the predetermined point using color representation system 2 using a second media type.

The same information is provided for color 403, best match of the predetermined point using color representation system 3 using a third media type.

A delta E is the result of a calculation of the different color coordinates LAB—where L is lightness, A is the green to red indicator and B the blue to yellow indicator. Brightness and hue can also be taken into account. One Delta E unit represents approximately the threshold detection level of the color difference. The difference between two colours can be measured instrumentally (using a calorimeter) and expressed in "Delta E units" (ΔE) where a Delta E value of zero represents a perfect match. The greater the Delta E value, the poorer the match and as a general rule a Delta E difference of 1.0 is perceivable visually while a Delta E difference of 0.2 represents the best match obtainable for commercially produced paints. In practice there are some shades where a small change in Delta E can result in a noticeable colour change. Yellows and brown shades are particularly Delta E sensitive while reds and blues can tolerate much larger Delta E changes without perceptible colour change. Greens lie somewhere in the middle.

Of these three colors 401, 402 and 403, it appears that the closest and most faithful representation of the predetermined color represented by the predetermined color point is the color 401 (2.24 ΔE). One should however consider that this color 401 is quite far from the closest reference point (19.97 ΔE). One should note that the reference points may be specific to a particular color representation system. A better choice than 401 may be color 403 which is closer to a reference color point (3.07 ΔE), even though it does not represent the predetermined color as well as color 401 does (because 3.32>2.24). What this means is that color 403 is "easier" to reproduce than 401, and that maybe worth for it to be selected, to the price of being 1 delta E further from the original reference. The designer has now the choice when is presented with an accurate summary of what the reproduction capabilities are. The advantage in being closer to a reference point is in facilitating communication, in that one can communicate that the choice is a color located at 3.07 ΔE from the reference point concerned, thus allowing a potential client or customer to get a better idea of the selected color. The invention simplifies the choice of the best color match by providing useful information and comparing a variety of color representation systems.

Figure 4A:
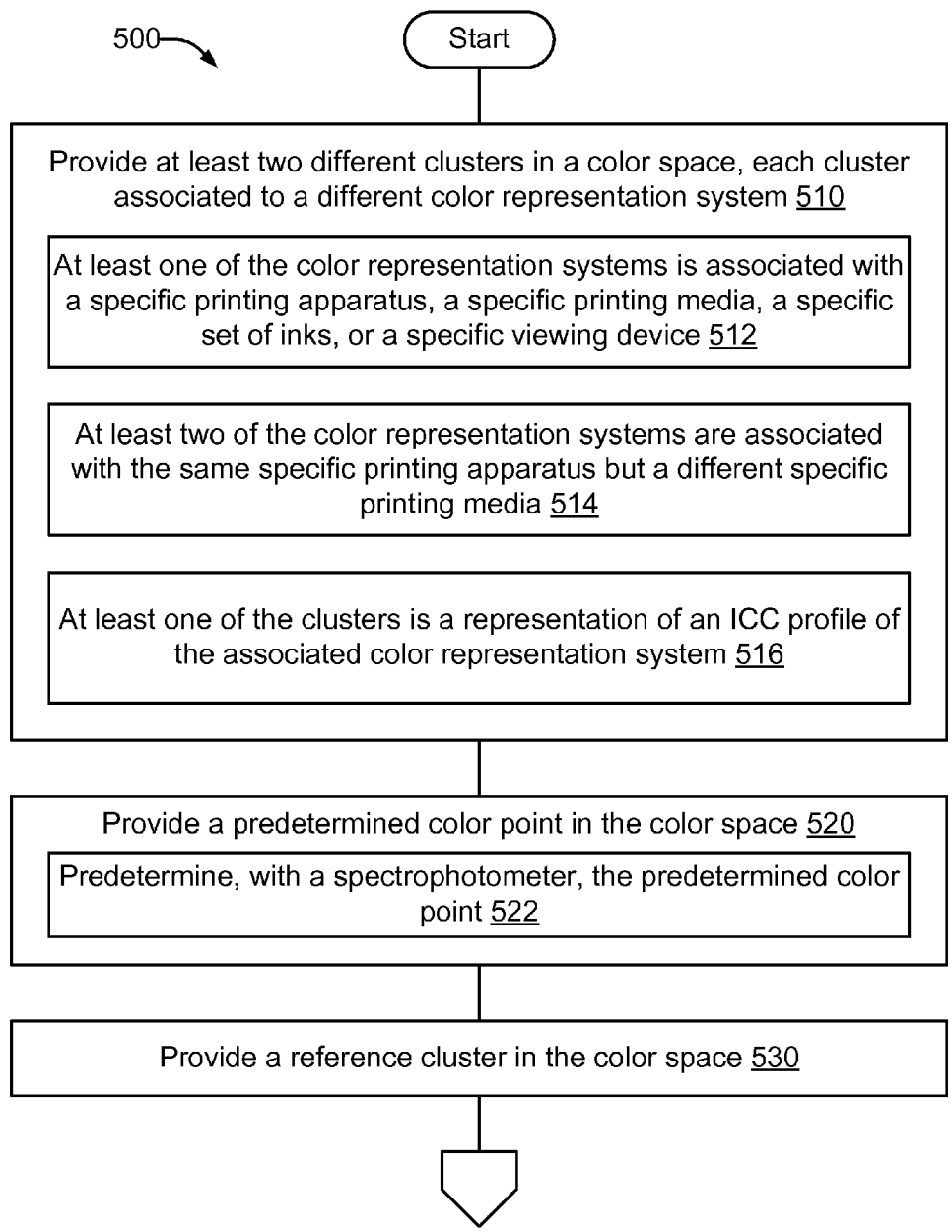

Considering now one example of a method of forming a color selection, and with reference to FIGS. 4A-4B, a method 500 begins, at 510, by providing at least two different clusters in a color space, each cluster associated to a different color representation system. In some examples, at 512, at least one of the color representation systems is associated with a specific printing apparatus, a specific printing media, a specific set of inks, or a specific viewing device. In some examples, at 514, at least two of the color representation systems are associated with the same specific printing apparatus but a different specific printing media. In some examples, at 516, at least one of the clusters is a representation of an ICC profile of the associated color representation system.

At 520, a predetermined color point in the color space is provided. In some examples, at 522, the predetermined color point is predetermined with a spectrophotometer.

At 530, a reference cluster in the color space is provided.

At 540, a color selection that includes a selected color point from each different cluster is formed with a processing system. Each selected color point is the point of the corresponding cluster which among all points of that cluster is closest to the predetermined color point. In some examples, at 542, the selected color point of a third or further cluster is excluded from the color selection, where the selected color points of a first and second cluster are closer to the predetermined color point than the at least one excluded color point.

In some examples, at 544, a distance-to-reference for each selected color point is evaluated. The distance-to-reference separates the selected color point from the point of the reference cluster closest to the selected color point. In some examples, at 546, the selected color point having the smallest distance-to-reference is identified.

In some examples, at 550, the color selection is represented using a color palette. In some examples, at 552, the color palette is displayed on a viewing device or a print media. In some examples, at 554, for each selected color point, the distance separating that color point from the predetermined color point is displayed. In some examples, at 556, for each selected color point, the distance-to-reference associated to that color point is displayed.

The invention claimed is:

1. Method of forming a color selection including selected color points, the method comprising:

providing a first cluster in a color space, the cluster being associated to a first color representation system;

providing a second cluster in the color space, the cluster being associated to a second color representation system, whereby the second cluster differs from the first cluster;

providing a reference cluster in the color space;

providing a predetermined color point in the color space that is not included in the reference cluster;

forming, using a processing system, the color selection that includes at least a first selected color point and a second selected color point, the first selected color point being the point of the first cluster which among all points of the first cluster is closest to the predetermined color point and the second selected color point being the point of the second cluster which among all points of the of the second cluster is closest to the predetermined color point; and evaluating using the processing system, for at least one selected color point, a distance to reference which separates the selected color point from a point of the reference cluster closest to the selected color point.

2. The method according to claim 1, whereby at least one of the color representation systems is associated to a specific printing media.

3. The method according to claim 1, whereby at least one of the color representation systems is associated to a specific printing apparatus.

4. The method according to claim 1, whereby both color representation systems are associated to the same specific printing apparatus and whereby both color representation systems are associated to different specific printing media.

5. The method according to claim 1, whereby at least one of the color representation systems is associated to a specific set of inks.

6. The method according to claim 1, whereby at least one of the color representation systems is associated to a specific viewing device.

7. The method according to claim 1, whereby a third or further clusters respectively associated to a third or further color representation systems are provided, whereby the color selection further comprises at least one third or further selected color point of each of the third or further clusters, each third or further selected color point being the point of the respective cluster which among all points of the respective cluster is closest to the predetermined color point.

8. The method according to claim 1 comprising identifying the selected color point having the smallest respective distance to reference.

9. The method according to claim 1, whereby the predetermined color point is provided using a spectrophotometer.

10. The method according to claim 1, whereby at least one of the first, second or further clusters is a representation of an ICC profile of the associated color representation system.

11. The method according to claim 1, whereby the color selection is represented by a color palette.

12. The method according to claim 11, whereby the color palette displays for each selected color point the distance separating the respective color point from the predetermined color point.

13. The method according to claim 11 whereby the color palette displays the distance to reference associated to each selected color point.

14. The method according to claim 1, comprising:

predetermining, using a spectrophotometer, the predetermined color point in the color space.

15. Method of forming a color selection including selected color points, the method comprising:

providing a first cluster in a color space, the cluster being associated to a first color representation system;

providing a second cluster in the color space, the cluster being associated to a second color representation system, whereby the second cluster differs from the first cluster;

providing a predetermined color point in the color space;

forming, with a processing system, the color selection that includes in the color selection at least a first selected color point and a second selected color point, the first selected color point being the point of the first cluster which among all points of the first cluster is closest to the predetermined color point and the second selected color point being the point of the second cluster which among all points of the of the second cluster is closest to the predetermined color point, whereby a third or further clusters respectively associated to a third or further color representation systems is or are provided, whereby at least one color point of one of the third or further clusters is excluded from the color selection, the at least one excluded point being the point of the respective cluster which among all points of the respective cluster is closest to the predetermined color point, the first and the second selected color points being closer to the predetermined color point than the at least one excluded color point.

16. The method according to claim 11, comprising:

displaying the color palette.

17. A method according to claim 16, whereby the palette is displayed using a viewing device.

18. A method according to claim 16, whereby the palette is displayed on a printing media.

19. A method of forming a color selection including selected color points, comprising:

providing at least three different clusters in a color space, each cluster associated to a different color representation system;

providing a predetermined color point in the color space;

forming, with a processing system, a color selection that includes a selected color point from each different cluster, each selected color point being the point of the corresponding cluster which among all points of the corresponding cluster is closest to the predetermined color point; and excluding from the selection, with the processing system, at least one of the selected color points such that at least two of the selected color points are retained, the retained color points being closer to the predetermined color point than the at least one excluded color point.

20. A method of forming a color selection including selected color points, the method comprising:

providing at least two different clusters in a color space, each cluster associated to a different color representation system;

providing a reference cluster in the color space;

providing a predetermined color point in the color space that is not included in the reference cluster;

forming, with a processing system, a color selection that includes a selected color point from each different cluster, each selected color point being the point of the corresponding cluster which among all points of the corresponding cluster is closest to the predetermined color point; and evaluating with the processing system, for at least one of the selected color points, a distance to reference which separates the selected color point from a point of the reference cluster closest to the selected color point.

\* \* \* \* \*

UNITED STATES PATENT AND TRADEMARK OFFICE
CERTIFICATE OF CORRECTION

| | |
|---|---|
| PATENT NO. | : 8,218,198 B2 |
| APPLICATION NO. | : 12/278922 |
| DATED | : July 10, 2012 |
| INVENTOR(S) | : Josep Abad Peiro et al. |

It is certified that error appears in the above-identified patent and that said Letters Patent is hereby corrected as shown below:

In column 9, line 14, in Claim 1, delete "of the of the" and insert -- of the --, therefor.

In column 10, line 13, in Claim 15, delete "of the of the" and insert -- of the --, therefor.

Signed and Sealed this
Eighth Day of January, 2013

David J. Kappos
*Director of the United States Patent and Trademark Office*